United States Patent
Yu et al.

(10) Patent No.: US 10,824,243 B2
(45) Date of Patent: *Nov. 3, 2020

(54) INTERACTION METHOD, INTERACTION APPARATUS, AND USER EQUIPMENT

(71) Applicant: BEIJING ZHIGU RUI TUO TECH CO., LTD., Beijing (CN)

(72) Inventors: Kuifei Yu, Beijing (CN); Ran Xu, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 65 days.

This patent is subject to a terminal disclaimer.

(21) Appl. No.: 15/414,757

(22) Filed: Jan. 25, 2017

(65) Prior Publication Data
US 2017/0228045 A1 Aug. 10, 2017

(30) Foreign Application Priority Data

Feb. 4, 2016 (CN) .......................... 2016 1 0079951

(51) Int. Cl.
*G06F 3/03* (2006.01)
*G06F 1/16* (2006.01)
*G06F 3/0346* (2013.01)

(52) U.S. Cl.
CPC .......... *G06F 3/0304* (2013.01); *G06F 1/1652* (2013.01); *G06F 3/0346* (2013.01)

(58) Field of Classification Search
None
See application file for complete search history.

(56) References Cited

U.S. PATENT DOCUMENTS

2010/0064244 A1\* 3/2010 Kilpatrick, II ........ G06F 1/1616
715/773
2012/0038570 A1\* 2/2012 Delaporte ............. G06F 1/1616
345/173

(Continued)

FOREIGN PATENT DOCUMENTS

CN 102150095 A 8/2011
CN 102857592 A 1/2013

*Primary Examiner* — Matthew Yeung
(74) *Attorney, Agent, or Firm* — Sheppard Mullin Richter & Hampton LLP

(57) ABSTRACT

Embodiments of the present application disclose an interaction method, an interaction apparatus, and user equipment. The method comprises: determining shape related information of a deformable image sensing surface, where the shape related information corresponds to a first shape of the deformable image sensing surface after a folding deformation; determining multiple effective interaction areas on the deformable image sensing surface at least according to the shape related information, where the multiple effective interaction areas meet the following conditions: in nonadjacent positions on the deformable image sensing surface, and adjacent in a spatial position in the first shape; and using the multiple effective interaction areas as one interaction area at least according to a first relative position of the multiple effective interaction areas in the spatial position in the first shape to provide an image sensing interface to at least one interaction object. The technical solutions in the embodiments of the present application can bring new experience to a user according to a deformation property of a deformable device.

28 Claims, 15 Drawing Sheets

(56) References Cited

U.S. PATENT DOCUMENTS

| | | | |
|---|---|---|---|
| 2012/0306910 A1 | 12/2012 | Kim | |
| 2015/0091778 A1* | 4/2015 | Day | G06F 3/1446 |
| | | | 345/1.3 |
| 2015/0301636 A1* | 10/2015 | Akimoto | G06F 3/044 |
| | | | 345/173 |
| 2016/0246559 A1* | 8/2016 | Jung | G06F 3/1431 |
| 2016/0299539 A1* | 10/2016 | Jang | G06F 1/1681 |

* cited by examiner

INTERACTION METHOD, INTERACTION APPARATUS, AND USER EQUIPMENT

CROSS REFERENCE TO RELATED APPLICATION

The present application is based on and claims the benefit of priority to Chinese Application No. 201610079951.1, filed on Feb. 4, 2016, the entire contents of which are incorporated herein by reference.

TECHNICAL FIELD

The present application relates to the field of interaction technologies, and in particular, to an interaction method, an interaction apparatus, and user equipment.

BACKGROUND

The present application relates to the field of interaction technologies, and in particular, to an interaction method, an interaction apparatus, and user equipment.

SUMMARY

A possible objective of embodiments of the present application is to provide an interaction solution based on a deformable image sensing surface.

According to a first aspect, a possible implementation solution of the present application provides an interaction method, comprising:

determining shape related information of a deformable image sensing surface, where the shape related information corresponds to a first shape of the deformable image sensing surface after a folding deformation;

determining multiple effective interaction areas on the deformable image sensing surface at least according to the shape related information, where the multiple effective interaction areas meet the following conditions: in nonadjacent positions on the deformable image sensing surface, and adjacent in a spatial position in the first shape; and using the multiple effective interaction areas as one interaction area at least according to a first relative position of the multiple effective interaction areas in the spatial position in the first shape to provide an image sensing interface to at least one interaction object.

According to a second aspect, a possible implementation solution of the present application provides an interaction apparatus, comprising:

an information determining module, configured to determine shape related information of a deformable image sensing surface, where the shape related information corresponds to a first shape of the deformable image sensing surface after a folding deformation;

an area determining module, configured to determine multiple effective interaction areas on the deformable image sensing surface at least according to the shape related information, where the multiple effective interaction areas meet the following conditions: in nonadjacent positions on the deformable image sensing surface, and adjacent in a spatial position in the first shape; and an image sensing interface providing module, configured to use the multiple effective interaction areas as one interaction area at least according to a first relative position of the multiple effective interaction areas in the spatial position in the first shape to provide an image sensing interface to at least one interaction object.

According to a third aspect, a possible implementation solution of the present application provides user equipment, where the user equipment comprises:

a memory, configured to store a program; and a processor, configured to execute the program stored in the memory, the program causes the processor to execute the following operations:

determining shape related information of a deformable image sensing surface, where the shape related information corresponds to a first shape of the deformable image sensing surface after a folding deformation;

determining multiple effective interaction areas on the deformable image sensing surface at least according to the shape related information, where the multiple effective interaction areas meet the following conditions: in nonadjacent positions on the deformable image sensing surface, and adjacent in a spatial position in the first shape; and using the multiple effective interaction areas as one interaction area at least according to a first relative position of the multiple effective interaction areas in the spatial position in the first shape to provide an image sensing interface to at least one interaction object.

In at least one implementation solution of the embodiments of the present application, after a deformation of a deformable image sensing surface occurs, multiple effective interaction areas adjacent in the spatial position are recombined to form one new interaction area used to provide an image sensing interface to an interaction object, thereby bringing new experience to a user by using a deformation property of a deformable device.

DETAILED DESCRIPTION

Figure 1:
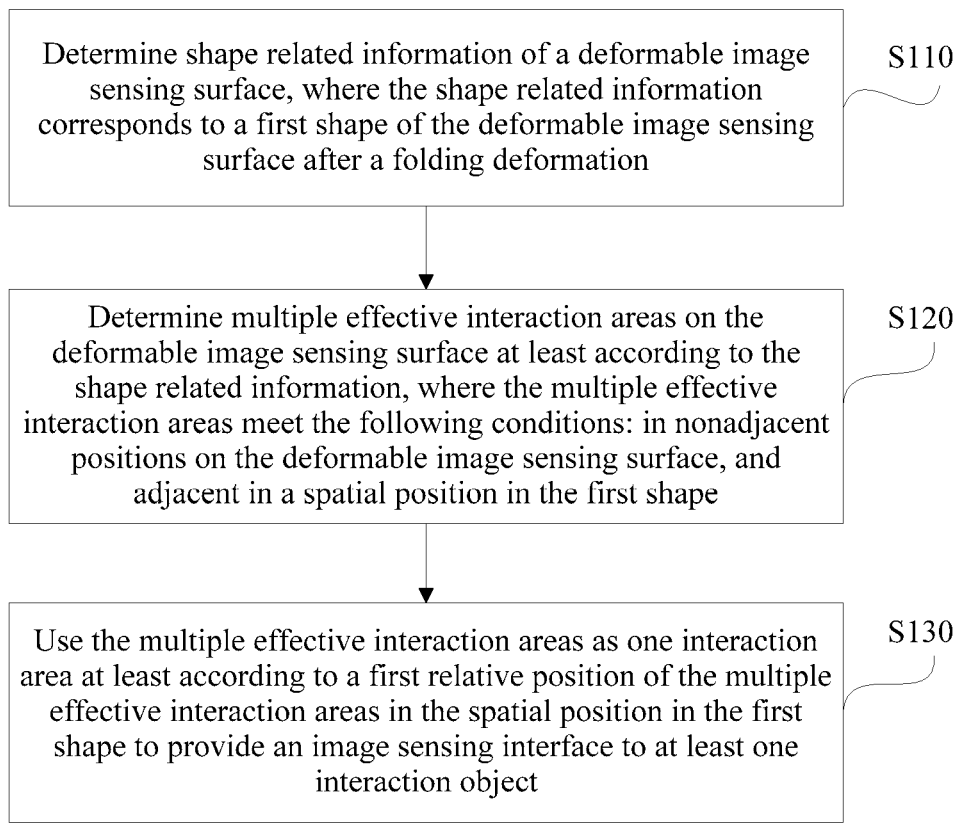
FIG. 1 is a schematic flowchart of an interaction method according to an embodiment of the present application.

The specific implementing manners of the present application are further described below in detail with reference to the accompanying drawings (a same reference numeral in several drawings represents a same element) and embodiments. The embodiments below are used for describing the present application rather than to limit the scope of the present application.

A person skilled in the art may understand that, terms such as "first" and "second" in the present application are only used to distinguish different steps, devices or modules and the like, but do not represent any specific technical meanings, and do not denote a necessary logic order among the steps, devices or modules and the like.

The inventor of the present application finds that, because a deformable image sensing surface has a changeable shape, after a deformation occurs, for some effective interaction areas before the deformation, for example, areas that are covered or blocked after the deformation occurs, effective interaction may no longer be able to be performed after the deformation occurs. Meanwhile, some multiple interaction areas that are originally scattered may become multiple effective interaction areas adjacent in a spatial position after the deformation occurs, and effective use of the multiple effective interaction areas may cause a deformable device to bring more desirable user experience to a user.

In the following description of the present application:

An interaction object of the deformable image sensing surface may be a photographed object, for example, a user and the like.

An effective interaction area is an area where effective interaction may be performed with an interaction object. In a possible implementing manner, the effective interaction area may be an area where the interaction object can be photographed. In some possible implementing manners, for example, it may be set that there is no obstacle within a set distance range on a side faced by the effective interaction area; and/or it is set that the effective interaction area faces a side where the interaction object is located; and so on. Alternatively, further, in another possible implementing manner, in addition to that the interaction object can be photographed, it is further required that the interaction meets a set interaction condition, to cause interaction between the effective interaction area and the interaction object to achieve an expected interaction effect. For example, the interaction condition may comprise that: an image acquired by using the effective interaction area meets a set standard, for example, a deformation standard, a definition standard, and the like.

A position of an area on a deformable image sensing surface is: a position of a coordinate area corresponding to the area on a coordinate surface, where the deformable image sensing surface is used as the coordinate surface. Regardless of how the deformable image sensing surface is curved or folded, a coordinate area corresponding to an area does not change.

A spatial position of an area is a position of the area in a spatial coordinate system.

As shown in FIG. 1, an embodiment of the present application provides an interaction method, comprising:

S110: Determine shape related information of a deformable image sensing surface, where the shape related information corresponds to a first shape of the deformable image sensing surface after a folding deformation.

S120: Determine multiple effective interaction areas on the deformable image sensing surface at least according to the shape related information, where the multiple effective interaction areas meet the following conditions: in nonadjacent positions on the deformable image sensing surface, and adjacent in a spatial position in the first shape.

S130: Use the multiple effective interaction areas as one interaction area at least according to a first relative position of the multiple effective interaction areas in the spatial position in the first shape to provide an image sensing interface to at least one interaction object.

For example, the interaction apparatus provided in the present application is used as an execution subject in this embodiment to execute S110 to S130. Specifically, the interaction apparatus may be disposed in user equipment in a manner of software, hardware or a combination of software and hardware, or, the interaction apparatus may be the user equipment. The user equipment comprises but not limited to a mobile phone, a computer, a television, a wearable device or the like that has a deformable image sensing surface that allows a folding deformation.

In an implementing manner in this embodiment of the present application, after a deformation of a deformable image sensing surface occurs, multiple effective interaction areas adjacent in the spatial position are recombined to obtain one new interaction area used to provide an image sensing interface to an interaction object, thereby bringing new experience to a user by using a deformation property of a deformable device.

The method in this embodiment of the present application is further described by using the following implementing manners.

Figure 2A:
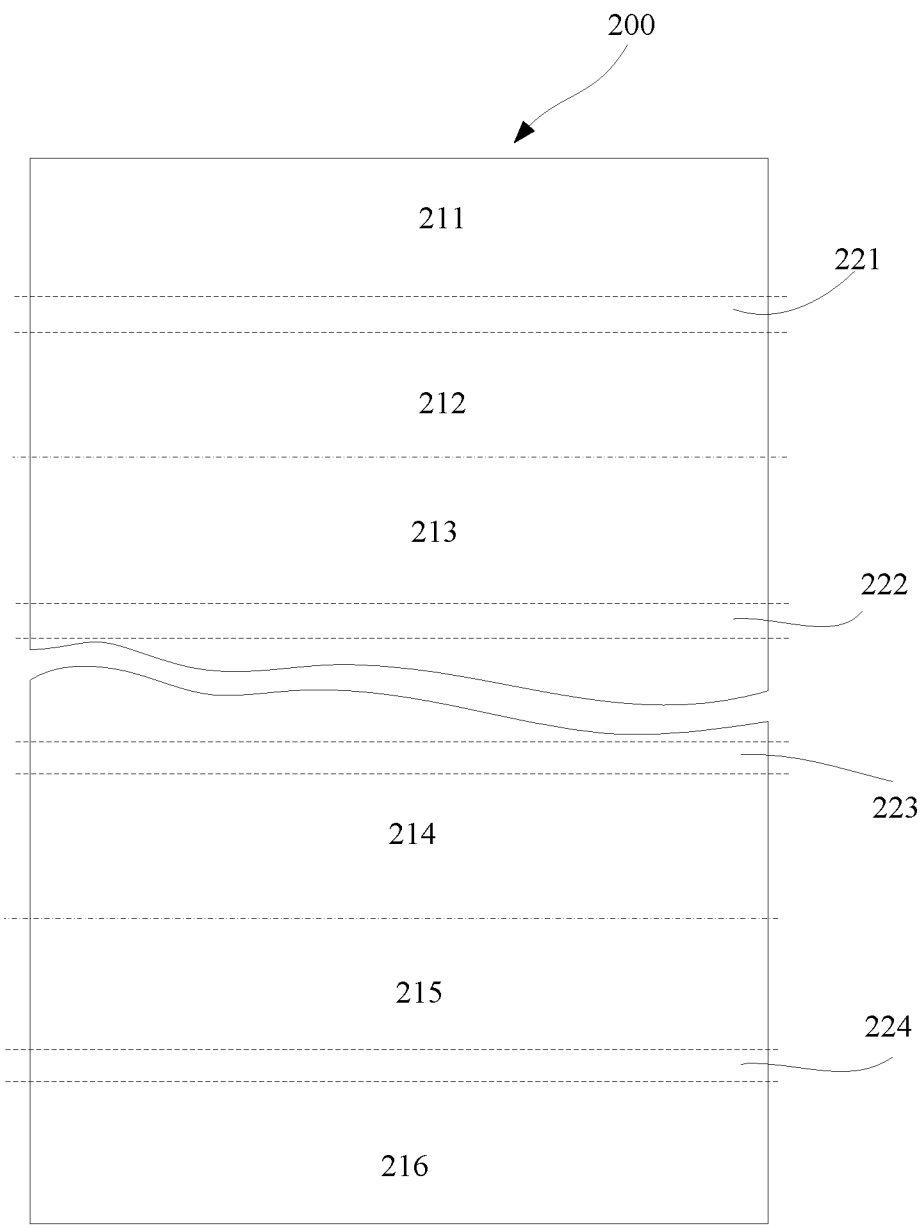
FIG. 2a to FIG. 2e are schematic diagrams of an application scenario of an interaction method according to an embodiment of the present application.
Figure 2B:
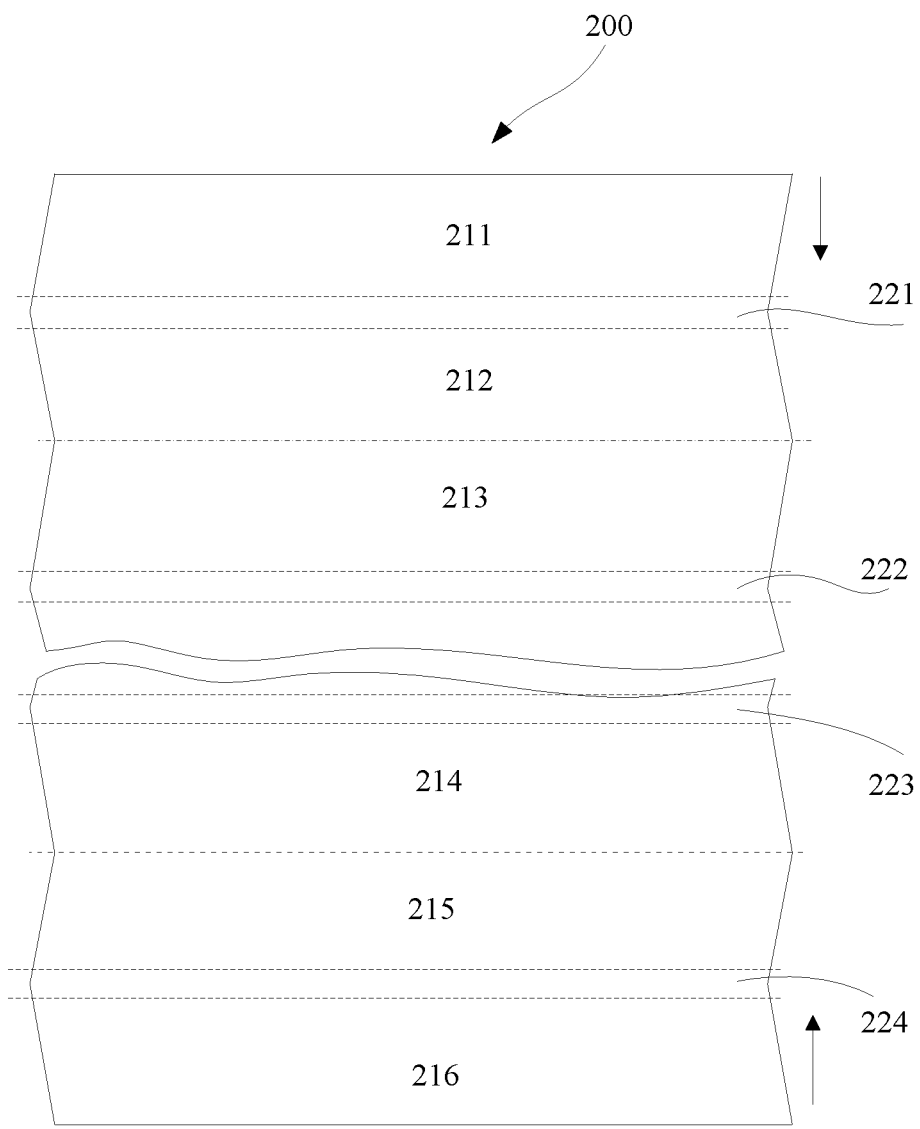

In a possible implementing manner, a shape of a deformable image sensing surface 200 being unfolded is a rectangle shown in FIG. 2a. During a folding deformation, the rectangle shown in FIG. 2a turns into a wavy state shown in FIG. 2b and eventually becomes a folded state shown in FIG. 2c. FIG. 2d is a right diagram of FIG. 2c.

As can be seen from FIG. 2a to FIG. 2d, after a folding deformation of a deformable image sensing surface 200 occurs, a part of the interaction area (for example, wing-surface areas 212 to 215) is folded and blocked and is no longer an effective interaction area. In some possible implementing manners, another part of interaction area (for example, wing-surface areas 211 and 216) may also be no longer an effective interaction area because of a facing-direction problem (for example, an interaction direction D of an interaction object to the deformable image sensing surface 200 is a direction right opposite the deformable image sensing surface 200 shown in FIG. 2a to FIG. 2c).

In the implementing manner shown in FIG. 2a to FIG. 2d, only several remaining folding areas 221 to 225 where several outwardly-bending end surfaces are located are effective interaction areas that still can be used to perform effective interaction with an interaction object.

In this embodiment of the present application, a folding area is an area corresponding to a bending end that connects two opposite wing surfaces in a creased structure. For example, a folding area 221 is an area corresponding to a bending end that connects two opposite wing surface areas 211 and 212 after folding.

Conventionally, after the foregoing folding deformation is performed on the deformable image sensing surface 200, for remaining effective interaction areas, a possible manner is: an interaction function of the entire deformable image sensing surface 200 is turned off, and interaction is no longer performed with the interaction object. Another possible manner is: The remaining effective interaction areas are still used as a part of the image sensing interface before the deformation to perform incomplete interaction with the interaction object.

The inventor of the present application finds that, in some scenarios, after the folding deformation of the deformable image sensing surface occurs, multiple effective interaction areas adjacent in a spatial position may be formed. Although an area of one effective interaction area may be relatively small and can hardly be used as a separate image sensing interface to perform interaction with an interaction object, the multiple effective interaction areas may be recombined into one relatively large interaction area and may be reused.

In this embodiment of the present application, shape related information corresponding to the first shape of the deformable image sensing surface after a folding deformation is determined, and the multiple effective interaction areas are then determined according to the shape related information.

In a possible implementing manner, optionally, the shape related information may comprise:

the first shape information of the first shape.

Figure 2C:
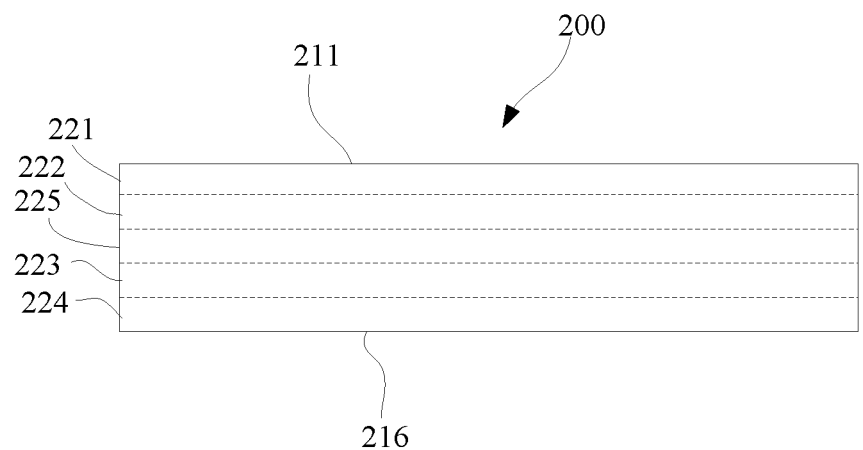
Figure 2D:
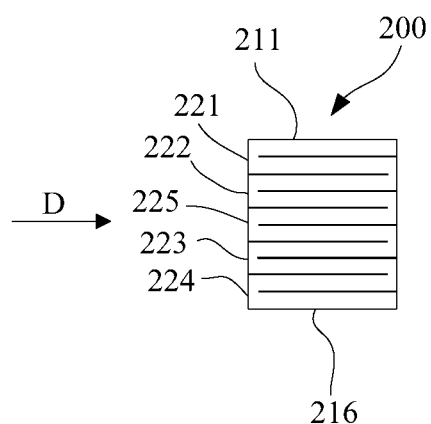

For example, in the implementing manner shown in FIG. 2a to FIG. 2d, shape information of the deformable image sensing surface after the folding shown in FIG. 2c and FIG. 2d may be acquired as the shape related information.

In another possible implementing manner, optionally, the shape related information may also be not the first shape information, and instead may indirectly obtain other information of the first shape information. For example, the shape related information comprises:

second shape information of a second shape of the deformable image sensing surface before the folding deformation, and deformation information corresponding to the folding deformation.

Here, the deformation information may be a shape change parameter, or may be another parameter related to a deformation. For example, when the deformable image sensing surface is a thermally-induced deformation material, the deformation information may comprise temperature change information and the like of areas. Alternatively, for example, the deformation information may further be displacement information, of areas on the deformable image sensing surface, acquired by using an acceleration sensing array, a gyroscope array, and the like corresponding to the deformable image sensing surface.

A person skilled in the art may know that the first shape may also be determined according to the second shape information and the deformation information.

In a possible implementing manner, the deformable image sensing surface is an interaction surface whose deformation is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in S110, the shape related information may be determined at least according to a deformation control instruction, where the deformation control instruction is used to control the folding deformation of the deformable image sensing surface.

For example, in the implementing manner as shown in FIG. 2a to FIG. 2d, a first deformation control instruction may be obtained in response to an operation that a user clicks a "Fold" button. The first deformation control instruction corresponds to the shape shown in FIG. 2c. In this case, regardless of a shape of the deformable image sensing surface before a folding deformation, once the first deformation control instruction is acquired, the deformable image sensing surface is automatically controlled to deform into the shape shown in FIG. 2c.

In other possible implementing manners, for example, when the deformation control instruction corresponds to deformation information, in S110, the second shape information further requires to be acquired to obtain the shape related information.

In addition to the foregoing the deformation control instruction, a deformation sensor configured to acquire corresponding deformation sensing information according to a deformation of the deformable image sensing surface may be further used to obtain the deformation related information. The deformation sensor, for example, may generate a corresponding voltage or current parameter value according to a deformation of the deformable image sensing surface, where the deformation sensing information is the voltage or current parameter value.

In a possible implementing manner, after the folding deformation of the deformable image sensing surface occurs, the shape related information may be determined at least according to the deformation sensing information.

In the method in this embodiment of the present application, after the shape related information is acquired, the multiple effective interaction areas may be determined at least according to the shape related information.

In this embodiment of the present application, the multiple effective interaction areas meet the following conditions: in nonadjacent positions on the deformable image sensing surface, and adjacent in a spatial position in the first shape.

Here, the multiple effective interaction areas are adjacent in a spatial position in the first shape, and therefore can be recombined into one interaction area.

In this embodiment of the present application, if two effective interaction areas are in adjacent positions on the deformable image sensing surface and are adjacent in the spatial position in the first shape, the two effective interaction areas may be seen as one effective interaction area.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0. For example, in the implementing manner shown in FIG. 2c and FIG. 2d, two adjacent effective interaction areas adjoin.

Figure 2E:
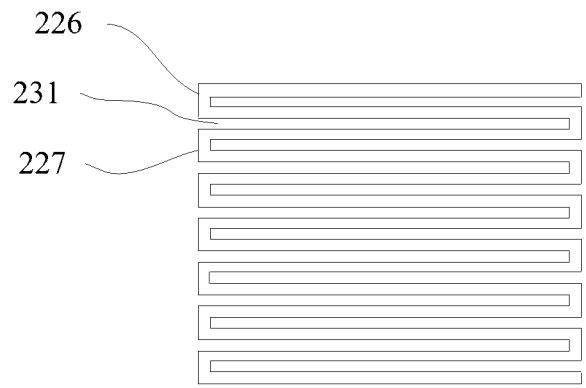

Alternatively, in another possible implementing manner, that two effective interaction areas are adjacent in a spatial position may be that a distance between nearby edges of the two interaction areas is less than a set value. For example, the deformable image sensing surface shown in FIG. 2a may also be folded and deformed into the shape shown in FIG. 2e. A gap area 231 further exists between the two adjacent effective interaction areas 226, 227. In this implementing manner, when a width (a width in a vertical direction in FIG. 2e) of the gap area 231 is less than set value, it may be considered that the two effective interaction areas 226, 227 are adjacent.

In some possible implementing manners, the set value may be determined according to influence of the distance on interaction of the interaction object. For example, when the distance between two adjacent effective interaction areas is too large to splice two pieces of image sensing sub-information acquired respectively (which comprises a case in which two image areas corresponding to the two pieces of image sensing sub-information cannot be spliced by using an image processing method, and a case in which a user sees the two image areas but cannot splice the two image areas), the distance between the two effective interaction areas is greater than the set value.

In a possible implementing manner, S120 may comprise: determining the multiple effective interaction areas at least according to the first image sensing information acquired by the deformable image sensing surface and the shape related information.

Here, for example, an image processing technology such as image edge analysis and image splicing may be used to process the first image sensing information, which may be used to assist in determining a boundary between the effective interaction area and another interaction area.

In a possible implementing manner, S120 may comprise:

determining, according to the shape related information, multiple folding areas where multiple outwardly-bending end surfaces are located, where the multiple outwardly-bending end surfaces are adjacent in the spatial position on the deformable image sensing surface in the first shape; and determining the multiple effective interaction areas at least according to the multiple folding areas.

In a possible implementing manner, the multiple effective interaction areas are the multiple folding areas.

As shown in FIG. 2a and FIG. 2c, positions of each two of the multiple folding areas 221 to 225 on the deformable image sensing surface are separated by at least another interaction area and are not adjacent to each other. In a deformed spatial position, the multiple folding areas 221 to 225 are adjacent. Therefore, in the implementing manner shown in FIG. 2a to FIG. 2d, it may be determined that the multiple folding areas 221 to 225 are the multiple effective interaction areas.

In some possible implementing manners, in addition to the foregoing the multiple folding areas, the multiple effective interaction areas may further comprise another area that is adjacent to or is connected to the multiple folding areas in the spatial position after the folding deformation occurs.

For example, in a possible implementing manner, as shown in FIG. 2a to FIG. 2d, the folding area 221 and the wing-surface area 211 that are connected may be used as one effective interaction area; and the folding area 224 and the wing-surface area 216 that are connected may be used as one effective interaction area.

Figure 3A:
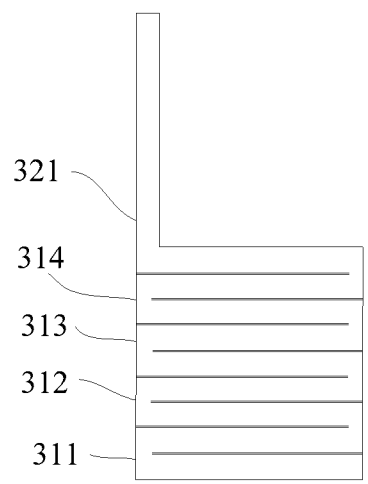
FIG. 3a and FIG. 3b are schematic diagrams of two shapes of a deformable image sensing surface being folded in an interaction method according to an embodiment of the present application.

Further, for example, in the implementing manner shown in FIG. 3a, in a case in which an interaction direction is considered, in addition to four folding areas 311 to 314, an unfolded area 321 (an area where a wing surface is located in a creased structure) is also an effective interaction area facing the interaction object, and is adjacent to the four folding areas 311 to 314 in the spatial position. Therefore, the multiple effective interaction areas further comprise the unfolded area 321.

Therefore, the determining the multiple effective interaction areas at least according to the multiple folding areas comprises:

determining the multiple effective interaction areas at least according to the multiple folding areas and the first shape.

As discussed above, in a possible implementing manner, the multiple effective interaction areas may be determined by combining the first image sensing information. Therefore, the determining the multiple effective interaction areas at least according to the multiple folding areas may comprise:

determining the multiple effective interaction areas according to the first image sensing information corresponding to the deformable image sensing surface and the multiple folding areas.

Figure 3B:
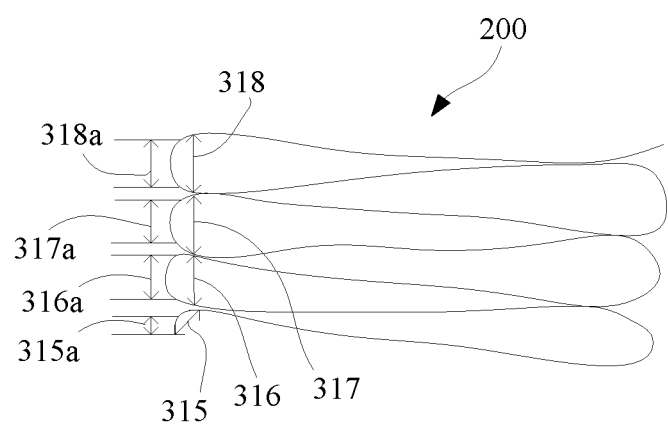

For example, in a possible implementing manner, a characteristic of interaction further needs to be considered to determine whether the multiple folding areas are all effective interaction areas. For example, in a possible implementing manner, a first shape of the deformable image sensing surface 200 shown in FIG. 2a after a folding deformation may also be shown in FIG. 3b, and four folding areas 315 to 318 may be determined according to the first shape. Here, in a shape shown in FIG. 3b, image areas acquired in parts of two adjacent folding areas close to each other may have repeated parts and/or parts that cannot be spliced. Therefore, the first image sensing information may be processed to determine a boundary between an effective interaction area and another area, so as to determine effective interaction parts on the four folding areas 315 to 318, to obtain four effective interaction areas 315a to 318a. Here, for example, four pieces of image sensing sub-information obtained by using the four effective interaction areas 315a to 318a may be spliced to obtain a basically complete image.

Certainly, in addition to the foregoing several factors that need to be considered, in some other possible implementing manners, during the determining the multiple effective interaction areas at least according to the multiple folding areas, another factor may further need to be considered.

In this embodiment of the present application, after the multiple effective interaction areas are determined, the multiple effective interaction areas may be used as one new interaction area to provide an image sensing interface to an interaction object.

In a possible implementing manner, the using the multiple effective interaction areas as one interaction area at least according to a first relative position may be: splicing the multiple effective interaction areas to the interaction area according to the first relative position.

In a possible implementing manner, the deformable image sensing surface implements interaction with an interaction object by using an interaction unit array that comprises multiple interaction units (here, the interaction unit is an image sensing unit), and each effective interaction area corresponds to multiple interaction units.

In a possible implementing manner, the splicing may be performing readdressing on addresses of interaction units in the multiple effective interaction areas, to obtain a new address that matches the interaction area.

For example, it is assumed that in the implementing manner shown in FIG. 2a, before the folding deformation, first addresses (x,y) of interaction units comprised in the folding area 221 and the folding area 222 (where x is a first row address, y is a first column address, and in a possible implementing manner, the first address may also be used as coordinates of a position of an interaction unit on the deformable image sensing surface) are shown in Table 1 and Table 2:

TABLE 1

First addresses of 30 interaction units
comprised in the folding area 221

| 13, 1 | 13, 2 | 13, 3 | 13, 4 | 13, 5 | 13, 6 | 13, 7 | 13, 8 | 13, 9 | 13, 10 |
| 14, 1 | 14, 2 | 14, 3 | 14, 4 | 14, 5 | 14, 6 | 14, 7 | 14, 8 | 14, 9 | 14, 10 |
| 15, 1 | 15, 2 | 15, 3 | 15, 4 | 15, 5 | 15, 6 | 15, 7 | 15, 8 | 15, 9 | 15, 10 |

TABLE 2

First addresses of 30 interaction units
comprised in the folding area 222

| | | | | | | | | | |
|---|---|---|---|---|---|---|---|---|---|
| 40, 1 | 40, 2 | 40, 3 | 40, 4 | 40, 5 | 40, 6 | 40, 7 | 40, 8 | 40, 9 | 40, 10 |
| 41, 1 | 41, 2 | 41, 3 | 41, 4 | 41, 5 | 41, 6 | 41, 7 | 41, 8 | 41, 9 | 41, 10 |
| 42, 1 | 42, 2 | 42, 3 | 42, 4 | 42, 5 | 42, 6 | 42, 7 | 42, 8 | 42, 9 | 42, 10 |

In this implementing manner, if readdressing is performed on addresses of the interaction units in the two folding areas 221, 222 according to relative positions in space of the two folding areas 221, 222 in the first shape after the folding deformation shown in FIG. 2c, second addresses (x1,y1) of the interaction units as shown in Table 3 and Table 4 may be obtained:

TABLE 3

Second addresses of the 30 interaction
units comprised in the folding area 221

| | | | | | | | | | |
|---|---|---|---|---|---|---|---|---|---|
| 1, 1 | 1, 2 | 1, 3 | 1, 4 | 1, 5 | 1, 6 | 1, 7 | 1, 8 | 1, 9 | 1, 10 |
| 2, 1 | 2, 2 | 2, 3 | 2, 4 | 2, 5 | 2, 6 | 2, 7 | 2, 8 | 2, 9 | 2, 10 |
| 3, 1 | 3, 2 | 3, 3 | 3, 4 | 3, 5 | 3, 6 | 3, 7 | 3, 8 | 3, 9 | 3, 10 |

TABLE 4

Second addresses of the 30 interaction
units comprised in the folding area 222

| | | | | | | | | | |
|---|---|---|---|---|---|---|---|---|---|
| 4, 1 | 4, 2 | 4, 3 | 4, 4 | 4, 5 | 4, 6 | 4, 7 | 4, 8 | 4, 9 | 4, 10 |
| 5, 1 | 5, 2 | 5, 3 | 5, 4 | 5, 5 | 5, 6 | 5, 7 | 5, 8 | 5, 9 | 5, 10 |
| 6, 1 | 6, 2 | 6, 3 | 6, 4 | 6, 5 | 6, 6 | 6, 7 | 6, 8 | 6, 9 | 6, 10 |

It may be seen that, after readdressing is performed on the addresses of the interaction units in the two folding areas 221, 222, second addresses of multiple interaction units respectively comprised in the two adjacent folding areas 221, 222 after the folding deformation are also adjacent and consecutive.

In another possible implementing manner, in the splicing, readdressing may also be not performed on the addresses of the interaction units in the multiple effective interaction areas, that is, the addresses of the interaction units are kept unchanged, but correlations between the addresses are changed.

For example, in a scenario in which the interaction units are scanned during interaction with an interaction object, the first address (15,10) of the last interaction unit of the folding area 221 and the first address (40,1) of the first interaction unit of the folding area 222 are correlated, to cause that during interaction of interaction information with an interaction object, after the last interaction unit of the folding area 221 is scanned, the first interaction unit of the folding area 222 is scanned next, and another area between the two folding areas 221, 222 is no longer scanned.

In a possible implementing manner, optionally, S130 may comprise:

determining the second image sensing information corresponding to the interaction area.

In a possible implementing manner, the determining the second image sensing information corresponding to the interaction area may further comprise:

determining multiple pieces of image sensing sub-information corresponding to the multiple effective interaction areas, for example, acquiring image sensing data corresponding to the multiple effective interaction areas, to obtain the multiple pieces of image sensing sub-information; and mapping the multiple pieces of image sensing sub-information from the multiple effective interaction areas to the interaction area according to the first relative position, to obtain the second image sensing information.

Figure 4A:
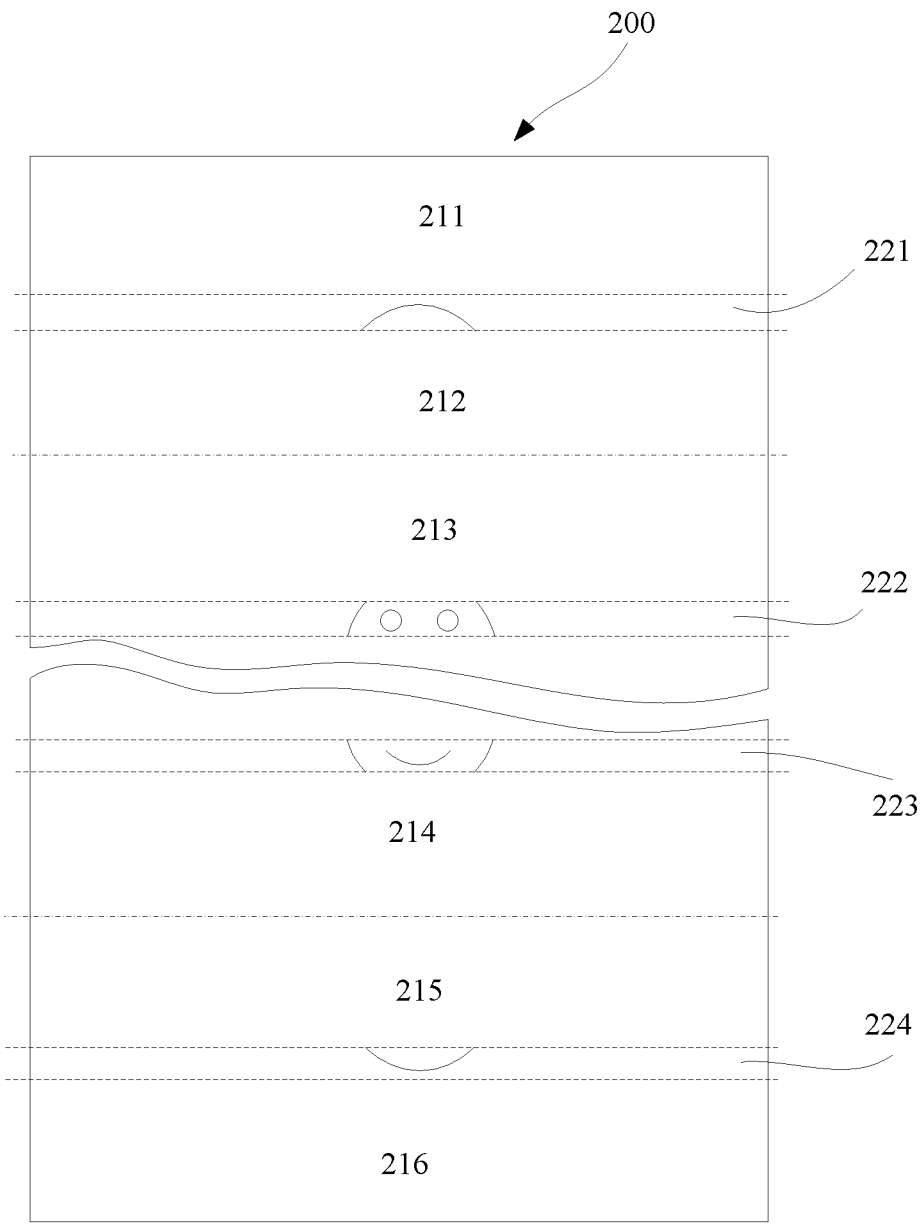
FIG. 4a and FIG. 4b are schematic diagrams of mapping of multiple pieces of image sensing sub-information from multiple effective interaction areas to interaction areas corresponding to the multiple effective interaction areas in an interaction method according to an embodiment of the present application.
Figure 4B:
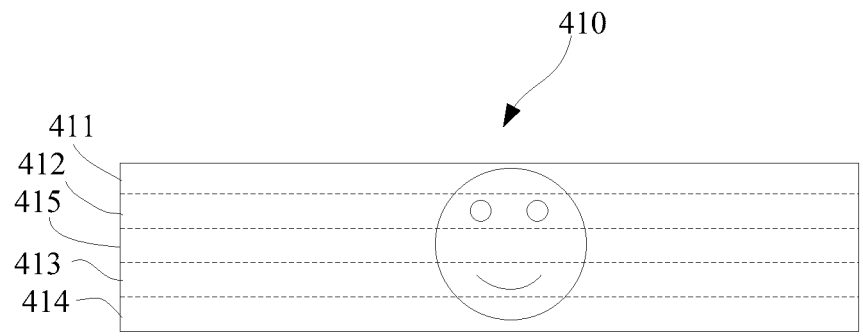

In a possible implementing manner, as shown in FIG. 4a and FIG. 4b, five pieces of image sensing sub-information obtained by using the five folding areas 221 to 224 (where one folding area is not shown) shown in FIG. 2a respectively correspond to five image areas 411 to 415, and the five pieces of image sensing sub-information are mapped to an interaction area 410. The obtained second image sensing information corresponds to a smiley face image shown in FIG. 4b.

Here, the mapping the multiple pieces of image sensing sub-information from the multiple effective interaction areas to the interaction area according to the first relative position, to obtain the second image sensing information may be implemented by using multiple manners, for example:

a) Implementation on an application layer: The first relative position is acquired by using a photography application or a video recording application, and mapping processing is performed according to the first relative position on the first image sensing information acquired from a bottom layer (for example, sensing information corresponding to an image shown in FIG. 4a). Image sensing information of an area other than the multiple effective interaction areas is deleted, and mapping and splicing are performed on multiple pieces of image sensing sub-information corresponding to the multiple effective interaction areas to acquire the second image sensing information.

Implementation on the application layer is more flexible. Each application may have its own implementation method. However, a working amount is also increased, because each application needs to implement its own processing method.

b) Implementation on an image sensor driver:

b1) An implementation that may be similar to that in an application layer, and a difference only lies in that all applications share a same processing manner. An image sensor driver program maintains a segmentation parameter corresponding to the first relative position, directly performs mapping processing on collected data (that is, the first image sensing information), and delivers processed data (that is, the second image sensing information) to an upper-layer application.

b2) For another implementation, an image sensor driver may be used to control hardware of the deformable image sensing surface for implementation. For example, an image sensor driver is used to set a value of a control register related to the deformable image sensing surface for implementation. For example, by means of the foregoing setting, the control register forbids data reading or collection in an area other than the multiple effective interaction areas, so that the image sensing data output from the deformable image sensing surface is the second image sensing information.

A person skilled in the art may know that in some possible implementing manners, a device may use any one of the foregoing three manners to implement the mapping. Here, the device may be selected flexibly according to a requirement. Certainly, for a device that selects one of multiple layers in real time to perform mapping, data to be captured in each frame may be labeled with whether the data has been mapped and on which layer the data expects to be mapped.

In another possible implementing manner, when the interaction apparatus does not comprise the deformable image sensing surface, the determining the second image sensing information may further be acquiring the second image sensing information from at least one external device by using a manner of communication.

A person skilled in the art may understand that, in the foregoing method of specific implementing manners of the present application, sequence numbers of steps do not mean an order of executing the steps, where the order of executing the steps should be determined by the functions and internal logic of the steps, and should not constitute any limitation on implementation processes of the specific implementing manners of the present application.

Figure 5:
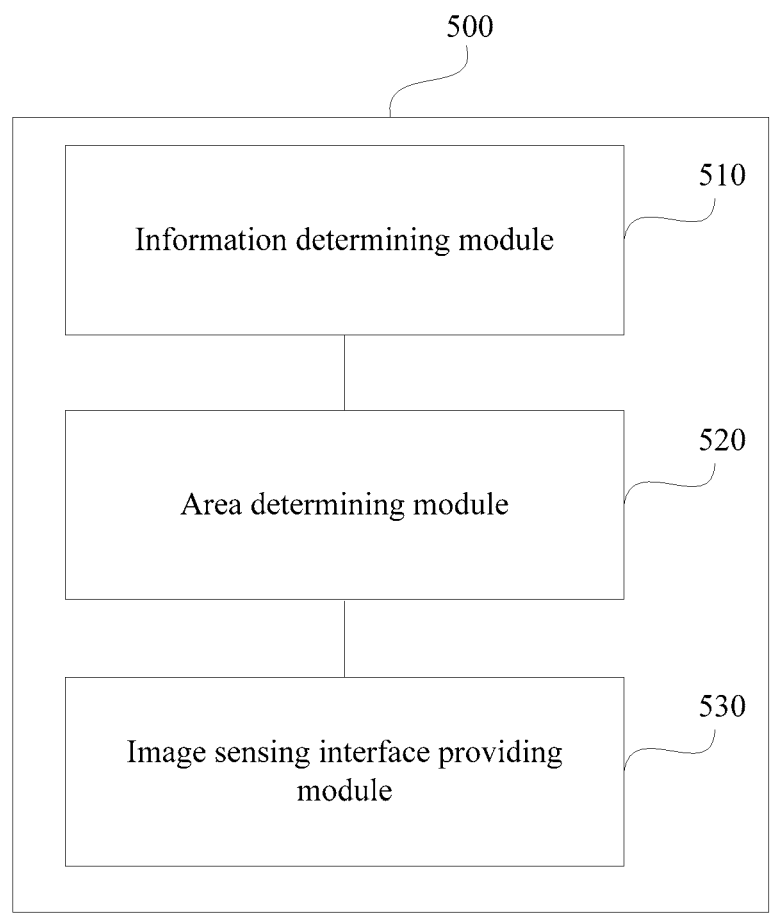
FIG. 5 is a schematic structural block diagram of an interaction apparatus according to an embodiment of the present application.

As shown in FIG. 5, an embodiment of the present application further provides an interaction apparatus 500, comprising:

an information determining module 510, configured to determine shape related information of a deformable image sensing surface, where the shape related information corresponds to a first shape of the deformable image sensing surface after a folding deformation;

an area determining module 520, configured to determine multiple effective interaction areas on the deformable image sensing surface at least according to the shape related information, where the multiple effective interaction areas meet the following conditions: in nonadjacent positions on the deformable image sensing surface, and adjacent in a spatial position in the first shape; and an image sensing interface providing module 530, configured to use the multiple effective interaction areas as one interaction area at least according to a first relative position of the multiple effective interaction areas in the spatial position in the first shape to provide an image sensing interface to at least one interaction object.

In an implementing manner in this embodiment of the present application, after a deformation of a deformable image sensing surface occurs, multiple effective interaction areas adjacent in the spatial position are recombined to obtain one new interaction area used to provide an image sensing interface to an interaction object, thereby bringing new experience to a user by using a deformation property of a deformable device.

The modules and units in this embodiment of the present application are further described by using the following implementing manners.

In a possible implementing manner, optionally, the shape related information may comprise:

the first shape information of the first shape.

In another possible implementing manner, optionally, the shape related information may also be not the first shape information, and instead may indirectly obtain other information of the first shape information. For example, the shape related information comprises:

second shape information of a second shape of the deformable image sensing surface before the folding deformation, and deformation information corresponding to the folding deformation.

Here, the deformation information may be a shape change parameter, or may be another parameter related to a deformation. For example, when the deformable image sensing surface is a thermally-induced deformation material, the deformation information may comprise temperature change information and the like of areas. Alternatively, for example, the deformation information may further be displacement information, of areas on the deformable image sensing surface, acquired by using an acceleration sensing array, a gyroscope array, and the like corresponding to the deformable image sensing surface.

A person skilled in the art may know that the first shape may also be determined according to the second shape information and the deformation information.

Figure 6A:
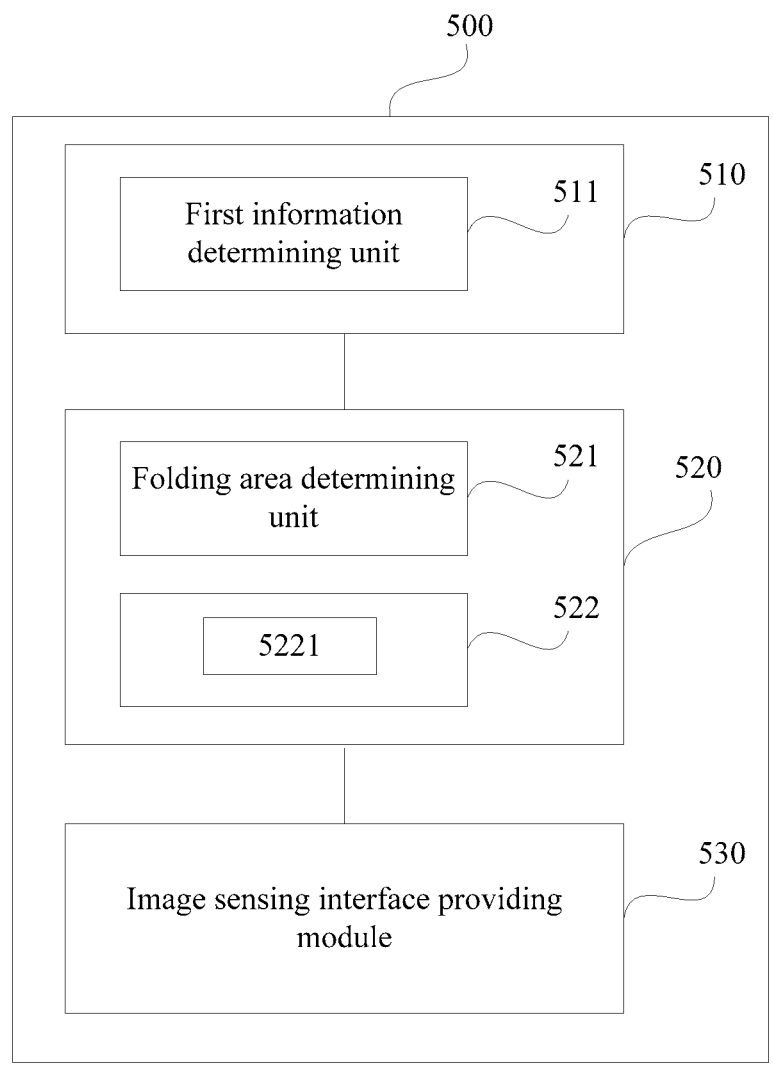
FIG. 6a to FIG. 6f are schematic structural block diagrams of six interaction apparatus according to an embodiment of the present application.

In a possible implementing manner, the deformable image sensing surface is an interaction surface whose deformation is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in a possible implementing manner, as shown in FIG. 6a, the information determining module 510 comprise:

a first information determining unit 511, configured to determine the shape related information at least according to a deformation control instruction, where the deformation control instruction is used to control the folding deformation of the deformable image sensing surface.

In a possible implementing manner, the first information determining unit 511 may, for example, acquire a correspondence between at least one deformation control instruction and at least one piece of deformation related information from a storage module according to the deformation control instruction, where the storage module stores the correspondence, and then obtain deformation related information corresponding to the deformation control instruction.

Figure 6B:
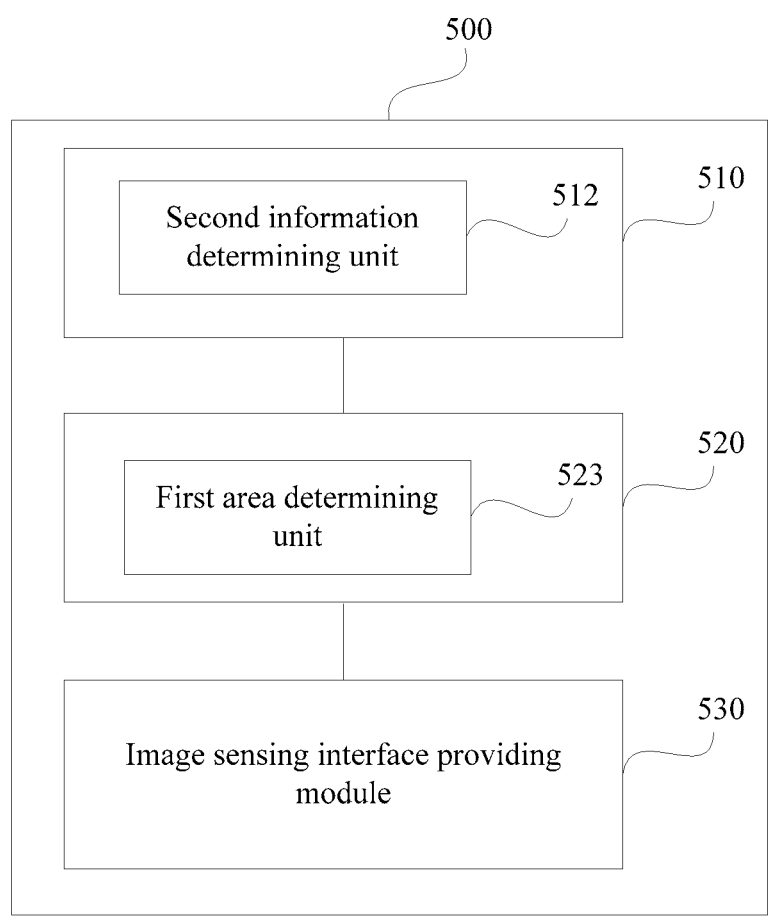

In addition to the foregoing the deformation control instruction, a deformation sensor configured to acquire corresponding deformation sensing information according to a deformation of the deformable image sensing surface may be further used to obtain the deformation related information. The deformation sensor, for example, may generate a corresponding voltage or current parameter value according to a deformation of the deformable image sensing surface, where the deformation sensing information is the voltage or current parameter value. Therefore, in a possible implementing manner, as shown in FIG. 6b, the information determining module 510 may comprise:

a second information determining unit 512, configured to determine the shape related information at least according to deformation sensing information for the deformable image sensing surface.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0.

Alternatively, in another possible implementing manner, that two effective interaction areas are adjacent in a spatial position may be that a distance between nearby edges of the two interaction areas is less than a set value.

In some possible implementing manners, the set value may be determined according to influence of the distance on interaction of the interaction object. For example, when the distance between two adjacent effective interaction areas is too large to splice two pieces of image sensing sub-information acquired respectively (which comprises a case in which two image areas corresponding to the two pieces of image sensing sub-information cannot be spliced by using an image processing method, and a case in which a user sees the two image areas but cannot splice the two image areas), the distance between the two effective interaction areas is greater than the set value.

In a possible implementing manner, as shown in FIG. 6b, the area determining module 520 comprises:

a first area determining unit 523, configured to determine the multiple effective interaction areas at least according to the first image sensing information corresponding to the deformable image sensing surface and the shape related information.

Here, for example, an image processing technology such as image edge analysis and image splicing may be used to process the first image sensing information, which may be used to assist in determining a boundary between the effective interaction area and another interaction area.

In a possible implementing manner, as shown in FIG. 6a, the area determining module 520 comprises:

a folding area determining unit 521, configured to determine, according to the shape related information, multiple folding areas where multiple outwardly-bending end surfaces are located, where the multiple outwardly-bending end surfaces are adjacent in the spatial position on the deformable image sensing surface in the first shape; and a second area determining unit 522, configured to determine the multiple effective interaction areas at least according to the multiple folding areas.

In a possible implementing manner, the multiple effective interaction areas are the multiple folding areas. Therefore, in this implementing manner, as shown in FIG. 6a, the second area determining unit 522 comprises:

a first determining subunit 5221, configured to determine that the multiple folding areas are the multiple effective interaction areas.

Figure 6C:
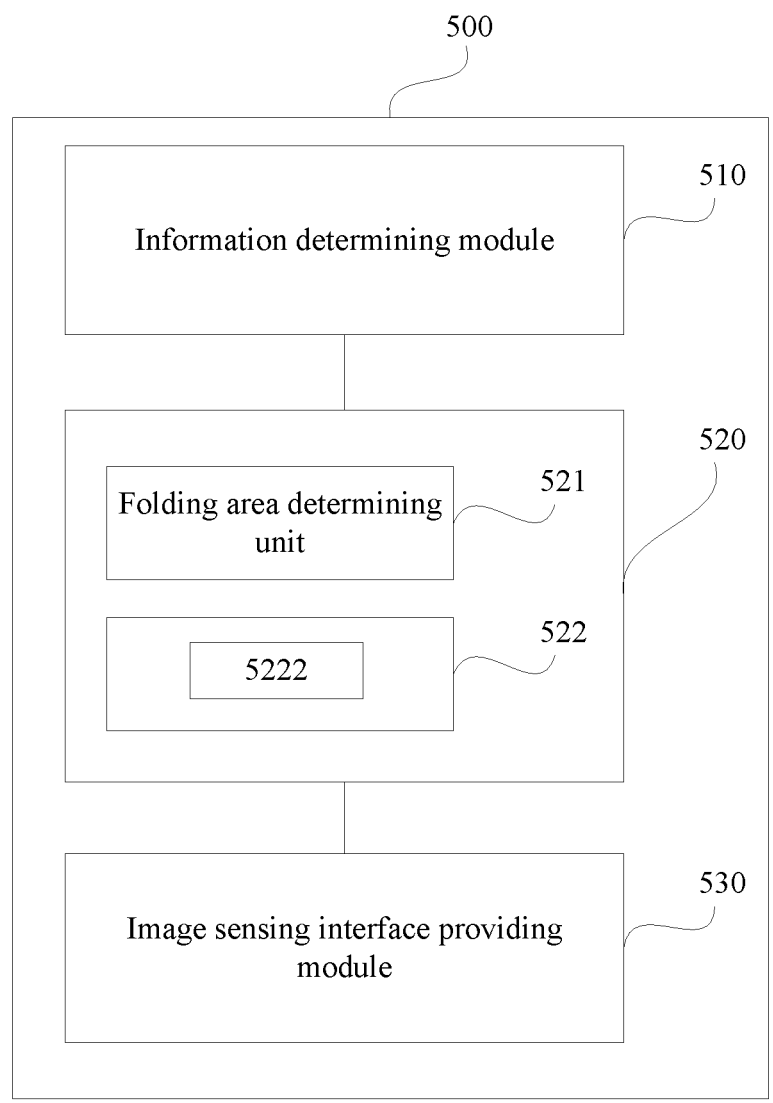

In some possible implementing manners, in addition to the foregoing the multiple folding areas, the multiple effective interaction areas may further comprise another area that is adjacent to or is connected to the multiple folding areas in the spatial position after the folding deformation occurs. Therefore, in this implementing manner, as shown in FIG. 6c, the second area determining unit 522 comprises:

a second determining subunit 5222, configured to determine the multiple effective interaction areas at least according to the multiple folding areas and the first shape.

Figure 6D:
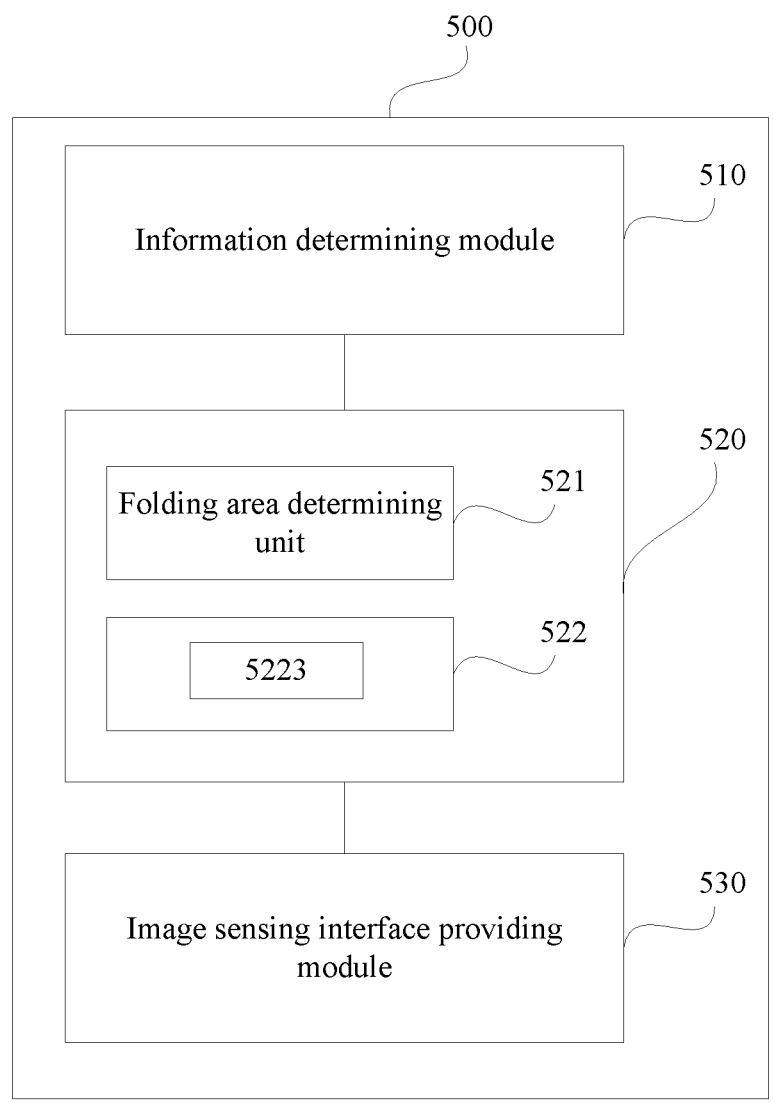

In a possible implementing manner, as shown in FIG. 6d, the second area determining unit 522 comprises:

a third determining subunit 5223, configured to determine the multiple effective interaction areas according to the first image sensing information corresponding to the deformable image sensing surface and the multiple folding areas.

Figure 6E:
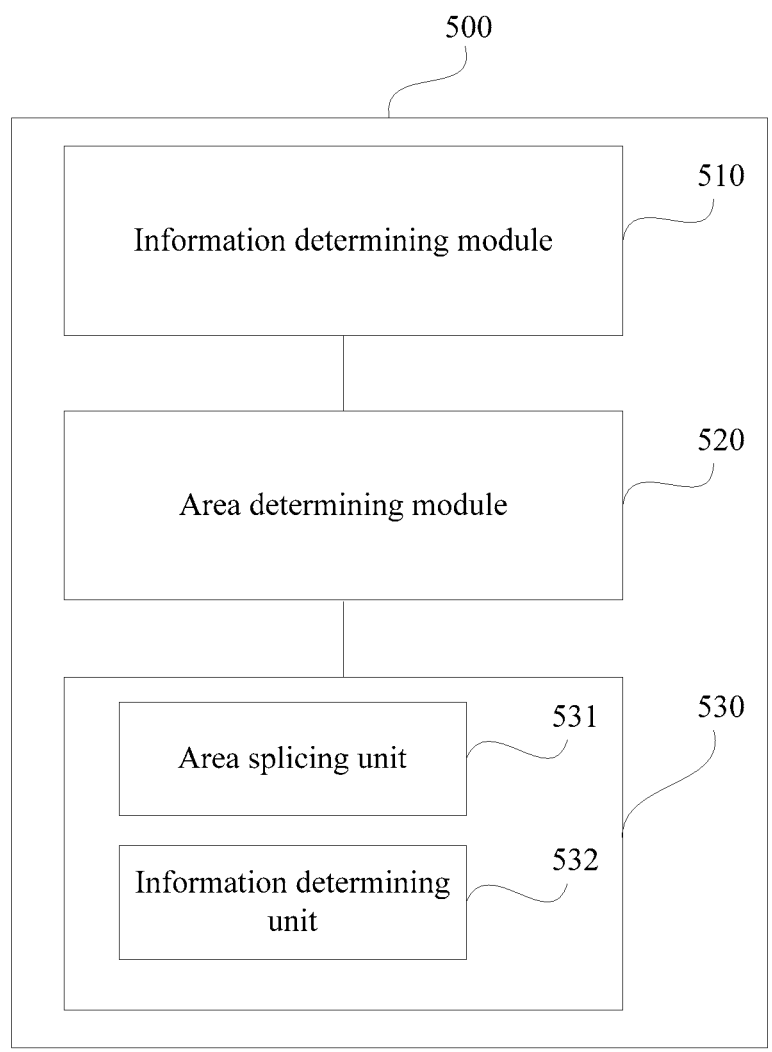

In a possible implementing manner, as shown in FIG. 6e, optionally, the image sensing interface providing module 530 may comprise:

an area splicing unit 531, configured to perform splicing on the multiple effective interaction areas according to the first relative position to form the interaction area. For a specific splicing manner, reference is made to the corresponding description in the foregoing method embodiments.

In a possible implementing manner, as shown in FIG. 6e, optionally, the image sensing interface providing module 530 may comprise:

an information determining unit 532, configured to determine the second image sensing information corresponding to the interaction area.

In a scenario in which the interaction apparatus comprises the deformable image sensing surface:

In a possible implementing manner, the information determining unit 532 may be further configured to:

perform image sensing scanning on the multiple image sensing units according to a correlation relationship between multiple image sensing units (that is, multiple image sensing units comprised in the multiple effective interaction areas) corresponding to the interaction area, to obtain the second image sensing information.

Figure 6F:
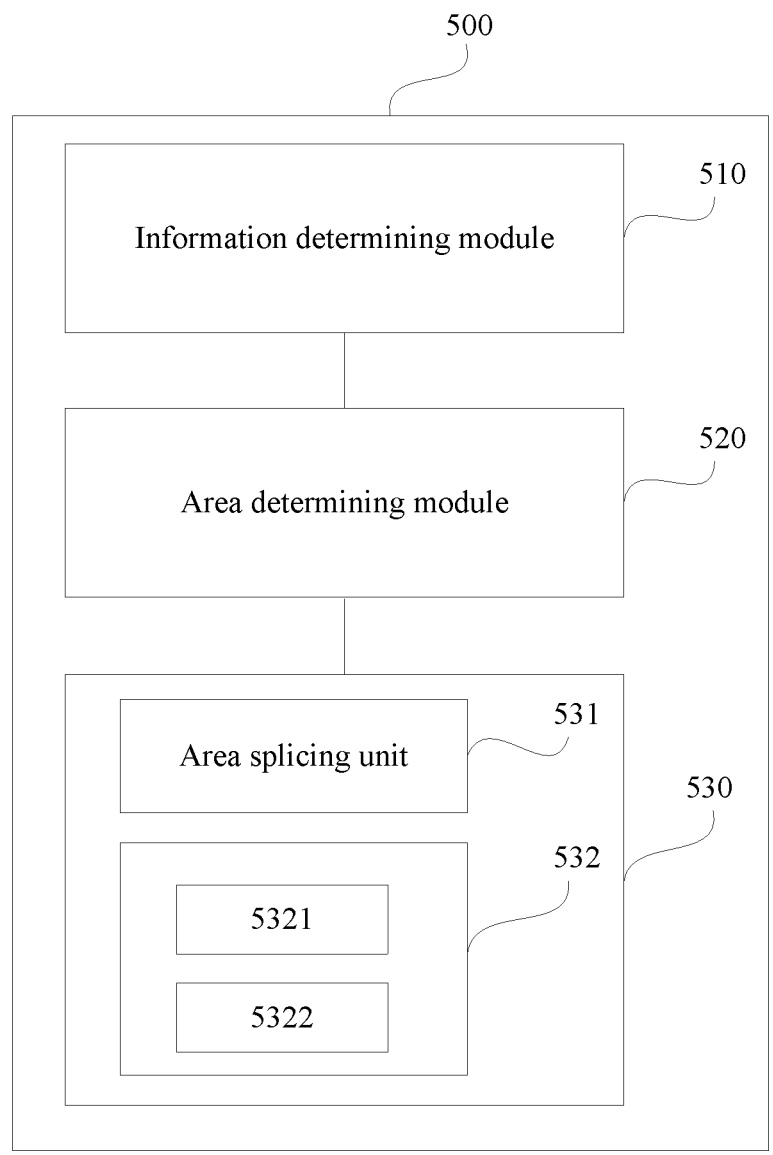

In another possible implementing manner, as shown in FIG. 6f, optionally, the information determining unit 532 comprises:

an information determining subunit 5321, configured to determine multiple pieces of image sensing sub-information corresponding to the multiple effective interaction areas, for example, acquire image sensing data corresponding to the multiple effective interaction areas, to obtain the multiple pieces of image sensing sub-information; and an information mapping subunit 5322, configured to map the multiple pieces of image sensing sub-information from the multiple effective interaction areas to the interaction area according to the first relative position, to obtain the second image sensing information.

In a scenario in which the interaction apparatus does not comprise the deformable image sensing surface, the information determining unit 532 may further comprise:

a communication subunit, configured to acquire the second image sensing information from at least one external device (for example, an external device comprising the deformable image sensing surface) by using a manner of communication.

For further description of functions of modules and units in this embodiment of the present application, reference is made to the corresponding description in the foregoing method embodiments.

Figure 7:
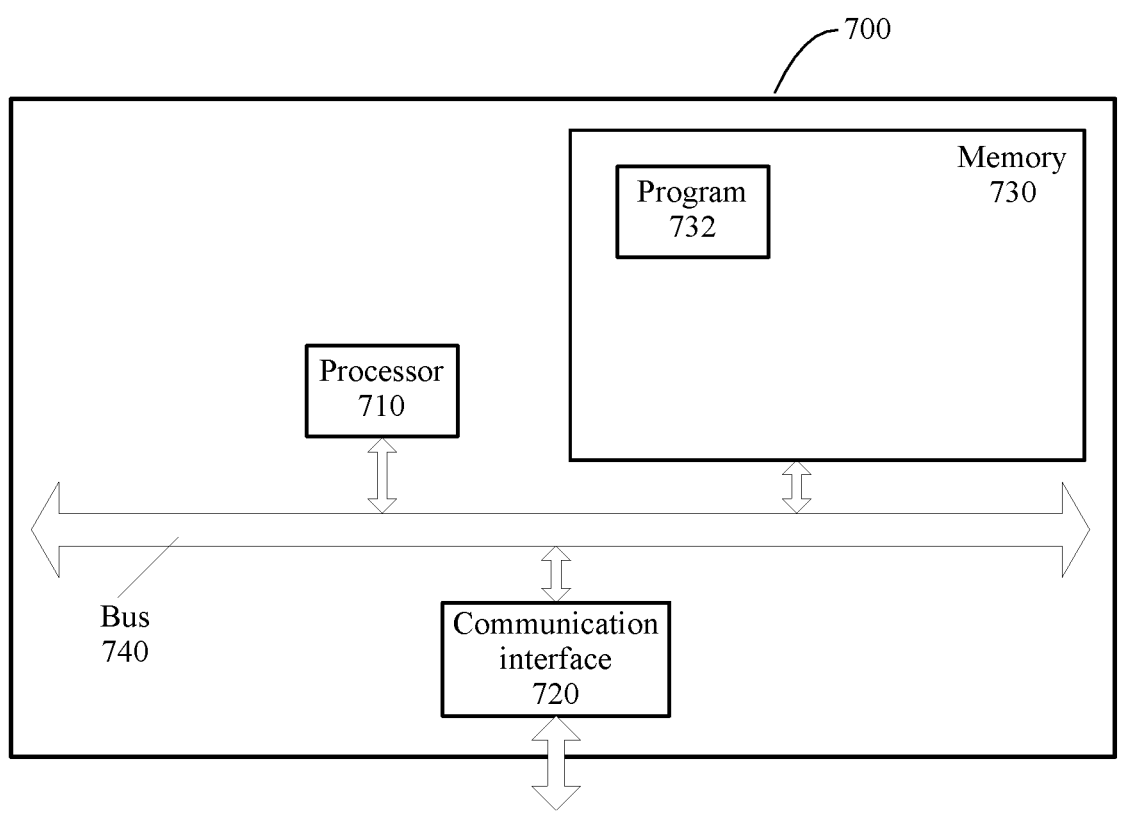
FIG. 7 is a schematic structural block diagram of user equipment according to an embodiment of the present application.

FIG. 7 is a schematic structural diagram of user equipment 700 according to an embodiment of the present application. In a specific embodiment of the present application, a specific implementation of the user equipment 700 is not limited. As shown in FIG. 7, the user equipment 700 may comprise:

a processor 710, a communication interface 720, a memory 730, and a communication bus 740.

The processor 710, the communication interface 720, and the memory 730 accomplish communication with each other by using the communication bus 740.

The communication interface 720 is configured to communicate with a network element such as a client.

The processor 710 is configured to execute a program 732, and specifically may execute related steps in the foregoing method embodiment.

Specifically, the program 732 may comprise program code, where the program code comprises a computer operation instruction.

The processor 710 may be a central processing unit (CPU), or an application specific integrated circuit (ASIC), or may be configured as one or more integrated circuits that implement this embodiment of the present application.

The memory 730 is configured to store the program 732. The memory 730 may comprise a high-speed RAM, or may further comprise a non-volatile memory, for example, at least one magnetic disk memory. The program 732 specifically may be configured to cause the user equipment 700 to execute the following operations:

determining shape related information of a deformable image sensing surface, where the shape related information corresponds to a first shape of the deformable image sensing surface after a folding deformation;

determining multiple effective interaction areas on the deformable image sensing surface at least according to the shape related information, where the multiple effective interaction areas meet the following conditions: in nonadjacent positions on the deformable image sensing surface, and adjacent in a spatial position in the first shape; and using the multiple effective interaction areas as one interaction area at least according to a first relative position of the multiple effective interaction areas in the spatial position in the first shape to provide an image sensing interface to at least one interaction object.

Reference may be made to corresponding description of corresponding steps and units in the foregoing embodiment for specific implementation of the steps in the program 732, which is no longer elaborated herein. A person skilled in the art may clearly understand that, for convenience and simplicity of description, reference may be made to corresponding process description in the foregoing method embodiment for a specific working process of devices and modules described above, which are no longer elaborated herein.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present invention.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or network equipment, etc.) to execute all or some steps of the method described in each embodiment of the present application. The foregoing storage medium comprises various media which can store a program code, such as a USB disk, a mobile hard disk, a read-only memory (ROM), a random-access memory (RAM), a magnetic disk or a compact disk.

The above implementations are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. An interaction method for sensing an image using a deformable image sensing surface, comprising:
    determining shape related information of a deformable image sensing surface, wherein the shape related information corresponds to a first shape of the deformable image sensing surface after a folding deformation;
    determining multiple effective interaction areas on the deformable image sensing surface after the folding deformation at least according to the shape related information, wherein the multiple effective interaction areas are areas where an effective interaction is performed with at least one interaction object and meet the following conditions: in nonadjacent positions on the deformable image sensing surface and adjacent in a spatial position in the first shape, wherein the multiple effective interaction areas are in the same deformable image sensing surface, wherein two effective interaction areas are deemed as adjacent in a spatial position if a distance between nearby edges of these two interaction areas is less than a set value and greater than zero, and wherein the set value is determined so that an image sensed by the two effective interaction areas is viewed by the at least one interaction object as a whole; and
    using the multiple effective interaction areas as one interaction area at least according to a first relative position of the multiple effective interaction areas in the spatial position in the first shape to provide an image sensing interface to the at least one interaction object for sensing an image.

2. The method of claim 1, wherein the shape related information comprises:
    first shape information of the first shape.

3. The method of claim 1, wherein the shape related information comprises:
    second shape information of a second shape of the deformable image sensing surface before the folding deformation, and deformation information corresponding to the folding deformation.

4. The method of claim 1, wherein the shape related information is determined at least according to a deformation control instruction.

5. The method of claim 1, wherein the shape related information is determined at least according to deformation sensing information for the deformable image sensing surface.

6. The method of claim 1, wherein the determining multiple effective interaction areas at least according to the shape related information comprises:
    determining the multiple effective interaction areas at least according to the first image sensing information acquired by the deformable image sensing surface and the shape related information.

7. The method of claim 1, wherein the determining multiple effective interaction areas at least according to the shape related information comprises:
    determining, according to the shape related information, multiple folding areas where multiple outwardly-bending end surfaces are located, wherein the multiple outwardly-bending end surfaces are adjacent in the spatial position on the deformable image sensing surface in the first shape; and
    determining the multiple effective interaction areas at least according to the multiple folding areas.

8. The method of claim 7, wherein the determining the multiple effective interaction areas at least according to the multiple folding areas comprises:
    determining that the multiple effective interaction areas are the multiple folding areas.

9. The method of claim 7, wherein the determining the multiple effective interaction areas at least according to the multiple folding areas comprises:
    determining the multiple effective interaction areas at least according to the multiple folding areas and the first shape.

10. The method of claim 7, wherein the determining the multiple effective interaction areas at least according to the multiple folding areas comprises:
    determining the multiple effective interaction areas according to the first image sensing information corresponding to the deformable image sensing surface and the multiple folding areas.

11. The method of claim 1, wherein that the multiple effective interaction areas are adjacent in the spatial position comprises:
    for a first effective interaction area of the multiple effective interaction areas, at least another effective interaction area that is adjacent in the spatial position to the first effective interaction area exists,
    wherein the first effective interaction area is any effective interaction area of the multiple effective interaction areas.

12. The method of claim 1, wherein the using the multiple effective interaction areas as one interaction area at least according to a first relative position to provide an image sensing interface to the at least one interaction object comprises:
    performing splicing on the multiple effective interaction areas according to the first relative position to form the interaction area.

13. The method of claim 1, wherein the using the multiple effective interaction areas as one interaction area at least according to a first relative position to provide an image sensing interface to the at least one interaction object comprises:
    determining the second image sensing information corresponding to the interaction area.

14. The method of claim 13, wherein the determining the image sensing information comprises:
    determining multiple pieces of image sensing sub-information corresponding to the multiple effective interaction areas; and
    mapping the multiple pieces of image sensing sub-information from the multiple effective interaction areas to the interaction area at least according to the first relative position, to obtain the second image sensing information.

15. User equipment for sensing an image using a deformable image sensing surface, wherein the user equipment comprises:
    a memory, configured to store a program; and
    a processor, configured to execute the program stored in the memory, the program causes the processor to execute the following operations:
    determining shape related information of a deformable image sensing surface, wherein the shape related information corresponds to a first shape of the deformable image sensing surface after a folding deformation;
    determining multiple effective interaction areas on the deformable image sensing surface after the folding deformation at least according to the shape related information, wherein the multiple effective interaction areas are areas where an effective interaction is performed with at least one interaction object and meet the following conditions: in nonadjacent positions on the deformable image sensing surface and adjacent in a spatial position in the first shape, wherein the multiple effective interaction areas are in the same deformable image sensing surface, wherein two effective interaction areas are deemed as adjacent in a spatial position if a distance between nearby edges of these two interaction areas is less than a set value and greater than zero, and the set value is determined so that an image sensed by the two effective interaction areas is viewed by the at least one interaction object as a whole; and
    using the multiple effective interaction areas as one interaction area at least according to a first relative position of the multiple effective interaction areas in the spatial position in the first shape to provide an image sensing interface to the at least one interaction object for sensing an image.

16. The user equipment of claim 15, wherein the shape related information comprises:
    first shape information of the first shape.

17. The user equipment of claim 15, wherein the shape related information comprises:
    second shape information of a second shape of the deformable image sensing surface before the folding deformation, and deformation information corresponding to the folding deformation.

18. The user equipment of claim 15, wherein the shape related information is determined at least according to a deformation control instruction.

19. The user equipment of claim 15, wherein the shape related information is determined at least according to deformation sensing information for the deformable image sensing surface.

20. The user equipment of claim 15, wherein the determining the multiple effective interaction areas at least according to the shaped related information comprises:
    determining the multiple effective interaction areas at least according to the first image sensing information corresponding to the deformable image sensing surface and the shape related information.

21. The user equipment of claim 15, wherein the determining multiple the effective interaction area at least according to the shape related information comprises:
    determining, according to the shape related information, multiple folding areas where multiple outwardly-bending end surfaces are located, wherein the multiple outwardly-bending end surfaces are adjacent in the spatial position on the deformable image sensing surface in the first shape; and
    determining the multiple effective interaction areas at least according to the multiple folding areas.

22. The user equipment of claim 21, wherein the determining the effective multiple effective interaction areas at least according to the multiple folding areas comprises:
    determining the multiple folding areas are the multiple effective interaction areas.

23. The user equipment of claim 21, wherein the determining the multiple effective interaction areas at least according to the multiple folding areas comprises:
    determining the multiple effective interaction areas at least according to the multiple folding areas and the first shape.

24. The user equipment of claim 21, wherein the determining the multiple effective interaction areas at least according to the multiple folding areas comprises:
    determining the multiple effective interaction areas according to the first image sensing information corresponding to the deformable image sensing surface and the multiple folding areas.

25. The user equipment of claim 15, wherein that the multiple effective interaction areas are adjacent in the spatial position comprises:
    for a first effective interaction area of the multiple effective interaction areas, at least another effective interaction area that is adjacent in the spatial position to the first effective interaction area exists,
wherein the first effective interaction area is any effective interaction area of the multiple effective interaction areas.

26. The apparatus of claim 15, wherein the operations further comprise:
performing splicing on the multiple effective interaction areas according to the first relative position to form the interaction area.

27. The apparatus of claim 15, wherein the operations further comprise:
determining the second image sensing information corresponding to the interaction area.

28. The apparatus of claim 27, wherein the operations further comprise:
determining multiple pieces of image sensing sub-information corresponding to the multiple effective interaction areas; and
mapping the multiple pieces of image sensing sub-information from the multiple effective interaction areas to the interaction area according to the first relative position, to obtain the second image sensing information.

\* \* \* \* \*